(12) United States Patent
Anderson et al.

(10) Patent No.: US 7,546,638 B2
(45) Date of Patent: Jun. 9, 2009

(54) AUTOMATED IDENTIFICATION AND CLEAN-UP OF MALICIOUS COMPUTER CODE

(75) Inventors: W. Kyle Anderson, Williamsburg, VA (US); Daryl Bonhaus, Williamsburg, VA (US)

(73) Assignee: Symantec Corporation, Mountain View, CA (US)

( * ) Notice: Subject to any disclaimer, the term of this patent is extended or adjusted under 35 U.S.C. 154(b) by 1171 days.

(21) Appl. No.: 10/392,593

(22) Filed: Mar. 18, 2003

(65) Prior Publication Data

US 2004/0187010 A1    Sep. 23, 2004

(51) Int. Cl.
*G08B 23/00* (2006.01)
*G06F 11/30* (2006.01)

(52) U.S. Cl. .......................... 726/24; 726/22; 713/188
(58) Field of Classification Search ................... 726/24
See application file for complete search history.

(56) References Cited

U.S. PATENT DOCUMENTS

| | | | |
|---|---|---|---|
| 5,398,196 A | 3/1995 | Chambers | |
| 5,452,442 A | 9/1995 | Kephart | |
| 5,495,607 A | 2/1996 | Pisello et al. | |
| 5,572,590 A | 11/1996 | Chess | |
| 5,675,710 A | 10/1997 | Lewis | |
| 5,694,569 A | 12/1997 | Fischer | |
| 5,826,012 A * | 10/1998 | Lettvin | 726/22 |
| 5,826,249 A | 10/1998 | Skeirik | |
| 5,832,208 A | 11/1998 | Chen et al. | |
| 5,832,527 A | 11/1998 | Kawaguchi | |
| 5,854,916 A | 12/1998 | Nachenberg | |
| 5,884,033 A | 3/1999 | Duvall et al. | |
| 5,944,821 A | 8/1999 | Angelo | |
| 5,974,549 A | 10/1999 | Golan | |
| 6,006,242 A | 12/1999 | Poole et al. | |
| 6,021,510 A | 2/2000 | Nachenberg | |
| 6,023,723 A | 2/2000 | McCormick et al. | |
| 6,052,709 A | 4/2000 | Paul | |
| 6,072,942 A | 6/2000 | Stockwell et al. | |

(Continued)

FOREIGN PATENT DOCUMENTS

EP    0636977 A2    2/1995

(Continued)

OTHER PUBLICATIONS

Carey Nachenberg, Computer Virus-Coevolution, 1997, ACM, pp. 46-51.*

(Continued)

*Primary Examiner*—Christopher A Revak
*Assistant Examiner*—Aravind K Moorthy
(74) *Attorney, Agent, or Firm*—Fenwick & West LLP

(57) ABSTRACT

Malicious computer code (101) is automatically cleaned-up from a target computer (103). An operating system (109) automatically boots (201) in the computer memory (105) of the target computer (103). The booted operating system (109) automatically runs (203) a malicious code processing script (113) in the computer memory (105) of the target computer (103), under control of the booted operating system (109). The malicious code processing script (113) automatically copies (205) and runs (207) at least one malicious code clean-up script (115). At least one malicious code clean-up script (115) automatically cleans-up (209) malicious code (101) from the target computer (103).

20 Claims, 7 Drawing Sheets

U.S. PATENT DOCUMENTS

| | | | |
|---|---|---|---|
| 6,088,803 A | 7/2000 | Tso et al. | |
| 6,092,194 A | 7/2000 | Touboul | |
| 6,094,731 A | 7/2000 | Waldin et al. | |
| 6,125,459 A | 9/2000 | Andoh et al. | |
| 6,161,130 A | 12/2000 | Horvitz et al. | |
| 6,167,434 A | 12/2000 | Pang | |
| 6,240,530 B1 * | 5/2001 | Togawa | 714/38 |
| 6,249,807 B1 | 6/2001 | Shaw et al. | |
| 6,253,169 B1 | 6/2001 | Apte et al. | |
| 6,282,565 B1 | 8/2001 | Shaw et al. | |
| 6,298,351 B1 | 10/2001 | Castelli et al. | |
| 6,347,310 B1 | 2/2002 | Passera | |
| 6,370,526 B1 | 4/2002 | Agrawal et al. | |
| 6,385,721 B1 * | 5/2002 | Puckette | 713/2 |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,487,586 B2 | 11/2002 | Ogilvie et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,546,416 B1 | 4/2003 | Kirsch | |
| 6,591,376 B1 * | 7/2003 | VanRooven et al. | 714/36 |
| 6,640,301 B1 | 10/2003 | Ng | |
| 6,654,787 B1 | 11/2003 | Aronson et al. | |
| 6,671,812 B1 * | 12/2003 | Balasubramaniam et al. | 726/22 |
| 6,687,740 B1 | 2/2004 | Gough | |
| 6,697,942 B1 | 2/2004 | L'Heureux | |
| 6,721,721 B1 | 4/2004 | Bates et al. | |
| 6,732,157 B1 | 5/2004 | Gordon et al. | |
| 6,751,789 B1 | 6/2004 | Berry et al. | |
| 6,763,458 B1 * | 7/2004 | Watanabe et al. | 713/100 |
| 6,772,346 B1 | 8/2004 | Chess et al. | |
| 6,792,556 B1 * | 9/2004 | Dennis | 714/6 |
| 6,842,861 B1 | 1/2005 | Cox et al. | |
| 6,886,099 B1 | 4/2005 | Smithson et al. | |
| 6,944,555 B2 | 9/2005 | Blackett et al. | |
| 6,952,779 B1 | 10/2005 | Cohen et al. | |
| 6,973,578 B1 | 12/2005 | McIchionc | |
| 7,024,403 B2 | 4/2006 | Kyler | |
| 7,216,366 B1 * | 5/2007 | Raz et al. | 726/24 |
| 2002/0035693 A1 | 3/2002 | Eyres et al. | |
| 2002/0038308 A1 | 3/2002 | Cappi | |
| 2002/0046207 A1 | 4/2002 | Chino et al. | |
| 2002/0073046 A1 | 6/2002 | David | |
| 2002/0073330 A1 * | 6/2002 | Chandnani et al. | 713/200 |
| 2002/0087649 A1 | 7/2002 | Horvitz | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0166059 A1 * | 11/2002 | Rickey et al. | 713/200 |
| 2002/0178375 A1 | 11/2002 | Whittaker et al. | |
| 2002/0194488 A1 | 12/2002 | Cormack et al. | |
| 2002/0194489 A1 | 12/2002 | Almogy et al. | |
| 2002/0199186 A1 | 12/2002 | Ali et al. | |
| 2002/0199194 A1 | 12/2002 | Ali | |
| 2003/0023875 A1 | 1/2003 | Hursey et al. | |
| 2003/0033587 A1 | 2/2003 | Ferguson et al. | |
| 2003/0061287 A1 | 3/2003 | Yu et al. | |
| 2003/0065926 A1 | 4/2003 | Schultz et al. | |
| 2003/0070087 A1 * | 4/2003 | Gryaznov | 713/201 |
| 2003/0110280 A1 | 6/2003 | Hinchliffe et al. | |
| 2003/0110393 A1 | 6/2003 | Brock et al. | |
| 2003/0110395 A1 | 6/2003 | Presotto et al. | |
| 2003/0115458 A1 | 6/2003 | Song | |
| 2003/0115479 A1 | 6/2003 | Edwards et al. | |
| 2003/0154394 A1 | 8/2003 | Levin | |
| 2003/0167402 A1 | 9/2003 | Stolfo et al. | |
| 2003/0229672 A1 | 12/2003 | Kohn | |
| 2003/0233352 A1 | 12/2003 | Baker | |
| 2003/0233415 A1 | 12/2003 | Beyda | |
| 2004/0015554 A1 | 1/2004 | Wilson | |
| 2004/0024823 A1 | 2/2004 | Del Monte | |
| 2004/0039921 A1 | 2/2004 | Chuang | |
| 2004/0054887 A1 | 3/2004 | Paulsen et al. | |
| 2004/0103310 A1 | 5/2004 | Sobel et al. | |
| 2004/0111480 A1 | 6/2004 | Yue | |
| 2004/0117401 A1 | 6/2004 | Miyata et al. | |
| 2004/0117641 A1 | 6/2004 | Kennedy et al. | |
| 2004/0153724 A1 * | 8/2004 | Nicholson et al. | 714/6 |
| 2004/0153840 A1 * | 8/2004 | Buchanan et al. | 714/42 |
| 2004/0205411 A1 * | 10/2004 | Hong et al. | 714/38 |
| 2004/0220975 A1 | 11/2004 | Carpentier et al. | |
| 2006/0185016 A1 * | 8/2006 | Sitze | 726/24 |
| 2008/0222177 A1 * | 9/2008 | Ramer | 707/101 |
| 2008/0222309 A1 * | 9/2008 | Shanbhogue | 709/250 |
| 2009/0038012 A1 * | 2/2009 | Bi et al. | 726/24 |

FOREIGN PATENT DOCUMENTS

| | | |
|---|---|---|
| EP | 1408393 A2 | 4/2004 |
| WO | WO 93/25024 A1 | 12/1993 |
| WO | WO 99/15966 A1 | 4/1999 |
| WO | WO 00/28420 A2 | 5/2000 |
| WO | WO 02/33525 A2 | 4/2002 |

OTHER PUBLICATIONS

Crescenzo et al, Cryptographic Hashing for Virus Localization, 2006, ACM, pp. 41-48.*

Wang et al, Investigations in Cross-site Script on Web-systems Gathering Digital Evidence against Cyber-Intrusion, 2007, IEEE, pp. 125-129.*

Qin et al, Polymorphic Algorithm of JavaScript Code Protection, 2008, IEEE, pp. 451-454.*

Burchell, Jonathan, "NetShield 1.5", Virus Bulletin, Aug. 1994, pp. 21-23, XP 000617453.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Cauce.org web pages [online ] Coalition Against Unsolicited Commercial Email [retrieved Mar. 17, 2003] Retrieved from the Internet: <URL: http://www.cauce.org/about/problem.shtml>.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf<.

Bontchev, Vesselin, "Possible Macro Virus Attacks and How to Prevent Them", Computer & Security, vol. 15, No. 7, pp. 595-626, 1996.

"Technical Responses to Spam," Nov. 2003, Taughannock Networks.

Kularski, C. "Compound Procedures for Spam Control" Highland School of Technology, Jan. 2004.

NBEC/NWOCA Anti-Spam Tools, [online] [retrieved Jul. 7, 2004] retrived from http://home.nwoca.org, Jul. 7, 2004.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

* cited by examiner

AUTOMATED IDENTIFICATION AND CLEAN-UP OF MALICIOUS COMPUTER CODE

TECHNICAL FIELD

This invention pertains to the automatic identification and clean-up of malicious computer code.

BACKGROUND ART

Computers are vulnerable to malicious computer code such as worms, viruses and Trojan horses. As used herein, "malicious computer code" is any code that enters a computer without an authorized user's knowledge and/or without an authorized user's consent, or code that disguises its nature and enters a computer with an authorized user's naive consent. Despite the deployment of software (e.g., anti-virus software) to protect computers from malicious code, computers still sometimes become infected with malicious code. Companies and individuals spend a lot of time and effort identifying and cleaning-up malicious code that has infected their computers.

Some companies that provide anti-virus software provide clean-up scripts that can identify and clean-up known malicious code (e.g., a known computer virus). New malicious code is frequently created and released. Therefore, new clean-up scripts have to be developed and distributed to identify and clean-up the new malicious code. Such scripts can be made available on web sites. Users can download these scripts, and run them in order to clean-up malicious computer code from their computers.

The procedures for downloading and running these scripts require active participation from the user. The user must know where current clean-up scripts are available, and which script (s) to download and run. The user must also know how to download and run the scripts. Running clean-up scripts often requires rebooting the computer, sometimes multiple times. Many contemporary computer users have minimal computer skills, and have difficulty successfully executing these procedures. Even where a user is capable of successfully running clean-up scripts, the user may find the procedure to be overly time consuming.

Additionally, where an infected computer has become unusable, a user must reboot their computer from an uninfected CD-ROM or floppy disk in order to subsequently download and run the required clean-up scripts. This procedure requires additional user participation and knowledge, making it difficult or impracticable for some users with minimal computer skills.

DISCLOSURE OF INVENTION

The present invention comprises methods, systems, and computer readable media for automatically cleaning-up malicious computer code (101) from a target computer (103) (as used herein "media" can comprise the singular or the plural). In some embodiments, an operating system (109) automatically boots (201) in the computer memory (105) of the target computer (103), from computer readable media (111). The booted operating system (109) comprises an operating system (109) other than the operating system (109) associated with the target computer (103). The booted operating system (109) automatically runs (203) a malicious code processing script (113) in the computer memory (105) of the target computer (103), under control of the booted operating system (109). The malicious code processing script (113) automatically copies (205) at least one malicious code clean-up script (115) from a location. The malicious code processing script (113) automatically runs (207) at least one copied malicious code clean-up script (115) in the computer memory (105) of the target computer (103). At least one malicious code clean-up script (115) automatically cleans-up (209) malicious code (101) from the target computer (103).

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1A:
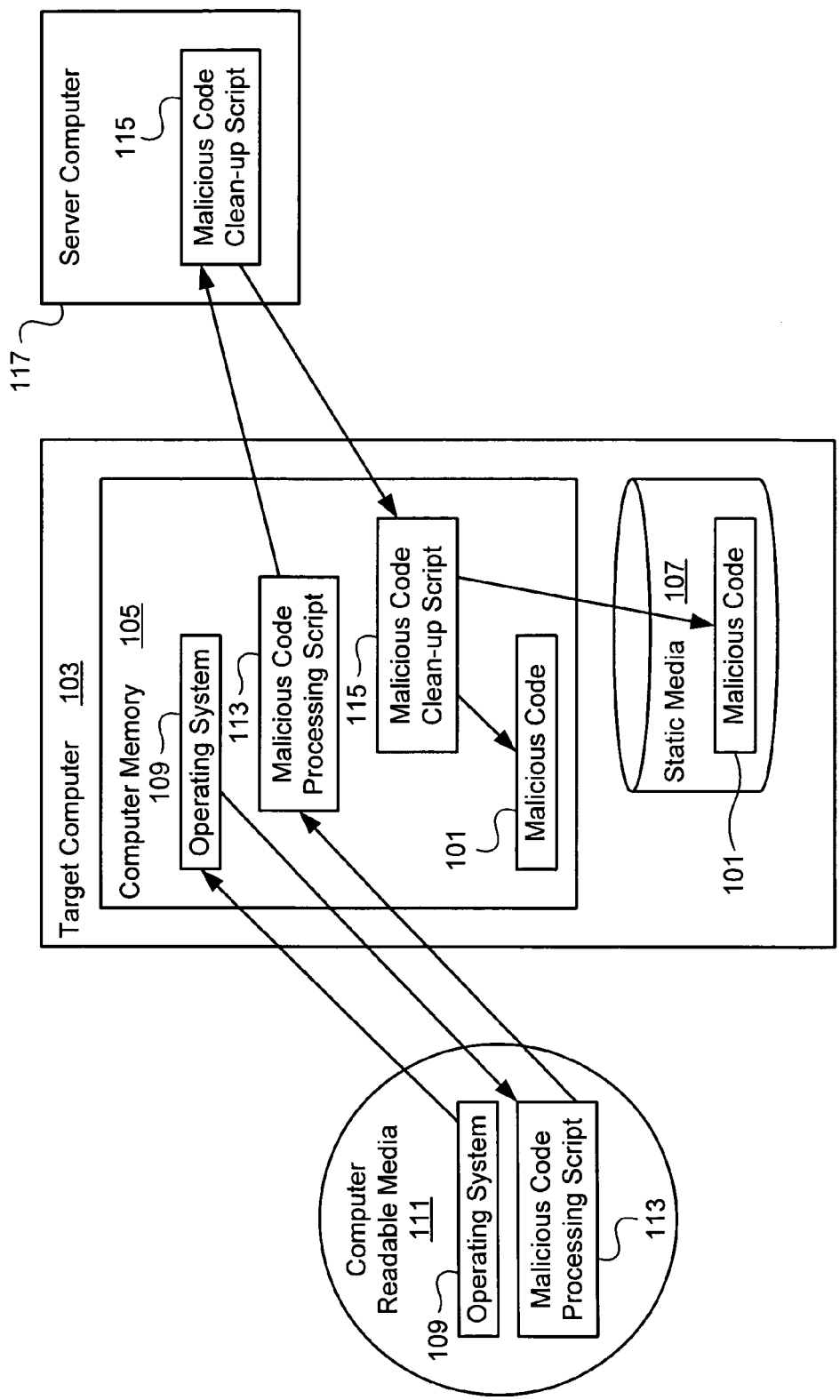
FIG. 1a is a block diagram illustrating a high level overview of one embodiment of the present invention.

FIG. 1a provides a high level overview of one embodiment of the present invention. Malicious code 101 has infected a target computer 103. In FIG. 1a, the malicious code 101 is present in both the computer memory 105 and static media 107 of the target computer 103. It is to be understood that malicious code 101 can infect the computer memory 105 and/or static media 107 of a target computer 103, and need not be present in both.

In accordance with the present invention, an operating system 109 automatically boots in the computer memory 105 of the target computer 103, from computer readable media 111. For example, a user can insert the computer readable media 111 containing the operating system 109 into an appropriate drive of the target computer 103, and the operating system 109 will boot automatically in a manner that will be readily apparent to one of ordinary skill in the art. A CD-ROM is an example of computer readable media 111 from which the operating system 109 can be booted, but of course the present invention is not limited to any specific type or format of computer readable media 111.

Figure 1B:
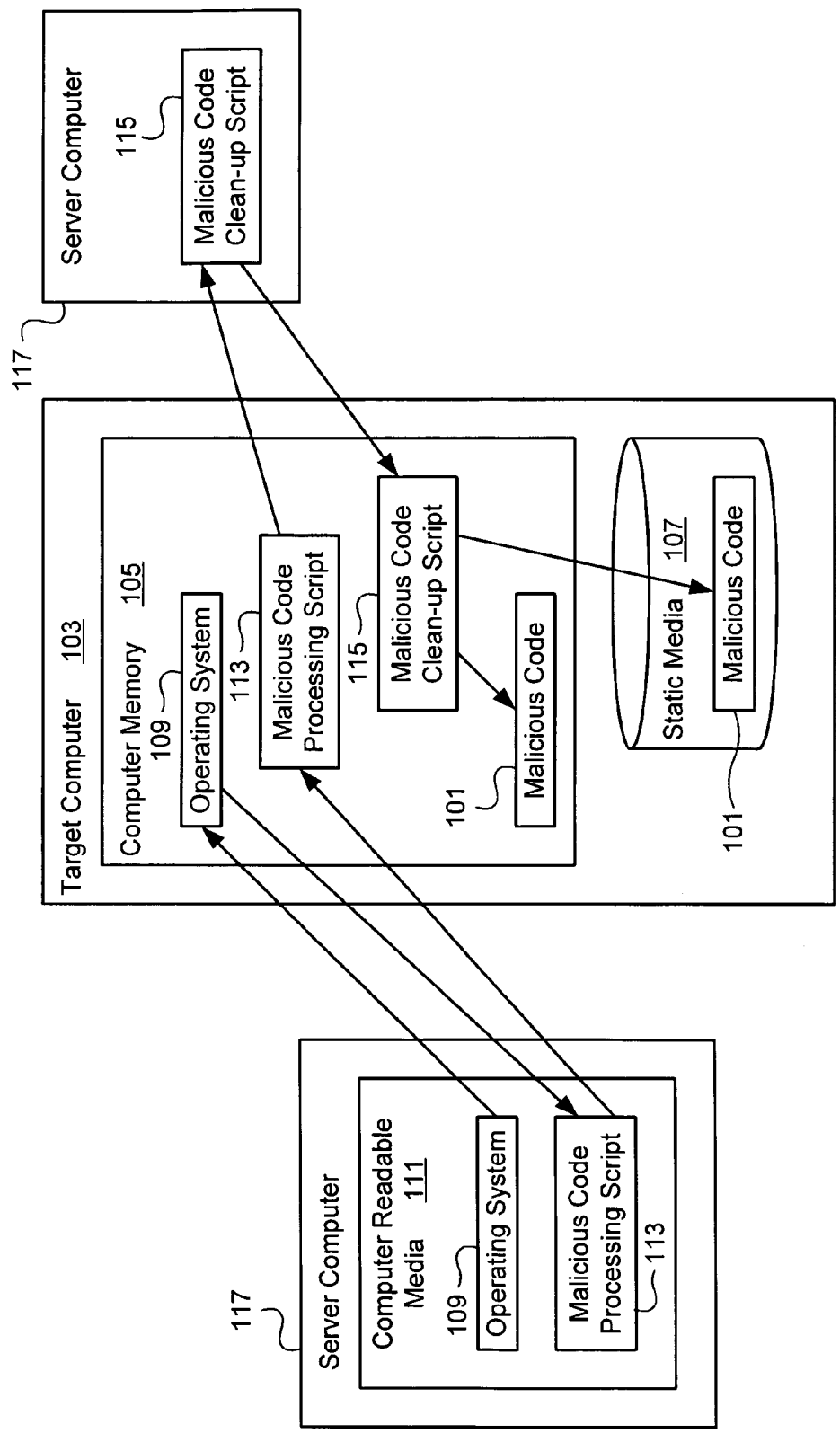
FIG. 1b is a block diagram illustrating a high level overview of another embodiment of the present invention.

FIG. 1b illustrates another example of computer readable media 111 from which the operating system 109 can be booted. In the embodiment illustrated in FIG. 1b, the computer readable media 111 is remote from the target computer 103, for example on a server computer 117. The mechanics of remote booting are known to those of ordinary skill in the relevant art. For example, the boot loader on the target computer 117 can be configured to present the user with a menu allowing the selection of either local or remote booting. Alternatively, the user can insert removable media into the target computer 117, the removable media including directives to initiate a remote boot. Other variations of remotely booting an operating system 109 will be readily apparent to those of ordinary skill in the relevant art. In other embodiments, the operating system is booted from a separate partition (physical or virtual) on the target computer 117.

Returning to FIG. 1a, the booted operating system 109 is one other than the operating system 109 associated with the target computer 103, so that it cannot become infected by the malicious code 101. For example, suppose that the target computer 103 runs a MICROSOFT WINDOWS® operating system 109. In that case, the malicious code 101 would be WINDOWS specific, and not designed to infect other operating systems 109, such as LINUX. Therefore, the user could, for example, use computer readable media 111 containing LINUX, in order to boot LINUX on the target computer. LINUX would be immune to the malicious code, allowing subsequent processing in conjunction with the present invention. Of course, the present invention is not limited to any specific operating system(s) 109.

The operating system 109 automatically runs a malicious code processing script 113 in the computer memory 105 of the target computer 103. The implementation details of the operating system 109 automatically running a script will be readily apparent to one of ordinary skill in the relevant art. It is to be understood that the malicious code processing script 113 can, but need not, comprise a subsection of an operating system boot script. FIG. 1a illustrates the operating system 109 loading the malicious code processing script 113 from the computer readable media 111 into the computer memory 105 of the target computer 103. In other embodiments, other methodologies can be used to automatically run the malicious code processing script 113 in the computer memory 105 of the target computer 103 under the control of the booted operating system 109.

The malicious code processing script 113 copies at least one malicious code clean-up script 115 from a location, such as a server computer 117 (as illustrated). In some embodiments in which the location comprises a server computer 117, the server computer 117 is outside of the local area network in which the target computer 103 is located, and in other embodiments the server computer 117 is part of the target computer's 103 local area network. In other embodiments, the location is one other than a server computer 117, as discussed further below. Various clean-up scripts 115 that can identify and clean-up known malicious code exist, and it will be readily apparent to one of ordinary skill in the relevant art that the malicious code processing script 113 can automatically copy such clean-up scripts 115 from a location where they reside.

The malicious code processing script 113 then automatically runs at least one malicious code clean-up script 115 in the computer memory 105 of the target computer 103. The malicious code clean-up script 115 proceeds to automatically clean-up malicious code 101 from the target computer 103. It will be readily apparent to those of ordinary skill in the relevant art that cleaning-up malicious code 101 can comprise eliminating the malicious code 101 from the target computer 103. It will also be understood that cleaning-up malicious code 101 can comprise actions other than eliminating the malicious code 101, for example repairing, quarantining, analyzing or transmitting infected file(s).

In order to clean-up malicious code 101 from the target computer 103, a malicious code clean-up script 115 must be able to write to the file system of the target computer 103. Recall that the malicious code clean-up script 115 is running under the control of the booted operating system 109, which is an operating system 109 other than the one associated with the target computer 103. Therefore, the malicious code clean-up script 115 must be able to write to the file system of an operating system 109 other than the one it is running under. For example, in one embodiment of the present invention, the target computer 103 could be configured to run WINDOWS, and the booted operating system could be LINUX, in which case the malicious code clean-up script 115 would run under LINUX. In that embodiment, the malicious code clean-up script 115 running under LINUX would need to be able to write to the WINDOWS file system. The manner in which the malicious code clean-up script 115 writes to the file system of another operating system will be readily apparent to those of ordinary skill in the relevant art. For example, writing to the WINDOWS NT file system from DOS and LINUX is known. The source code to write to the WINDOWS NT file system from DOS is commercially available from a company called Sysinternals. Additionally, current versions of LINUX for which the source code is publicly available include WINDOWS NT file system access.

Figure 2:
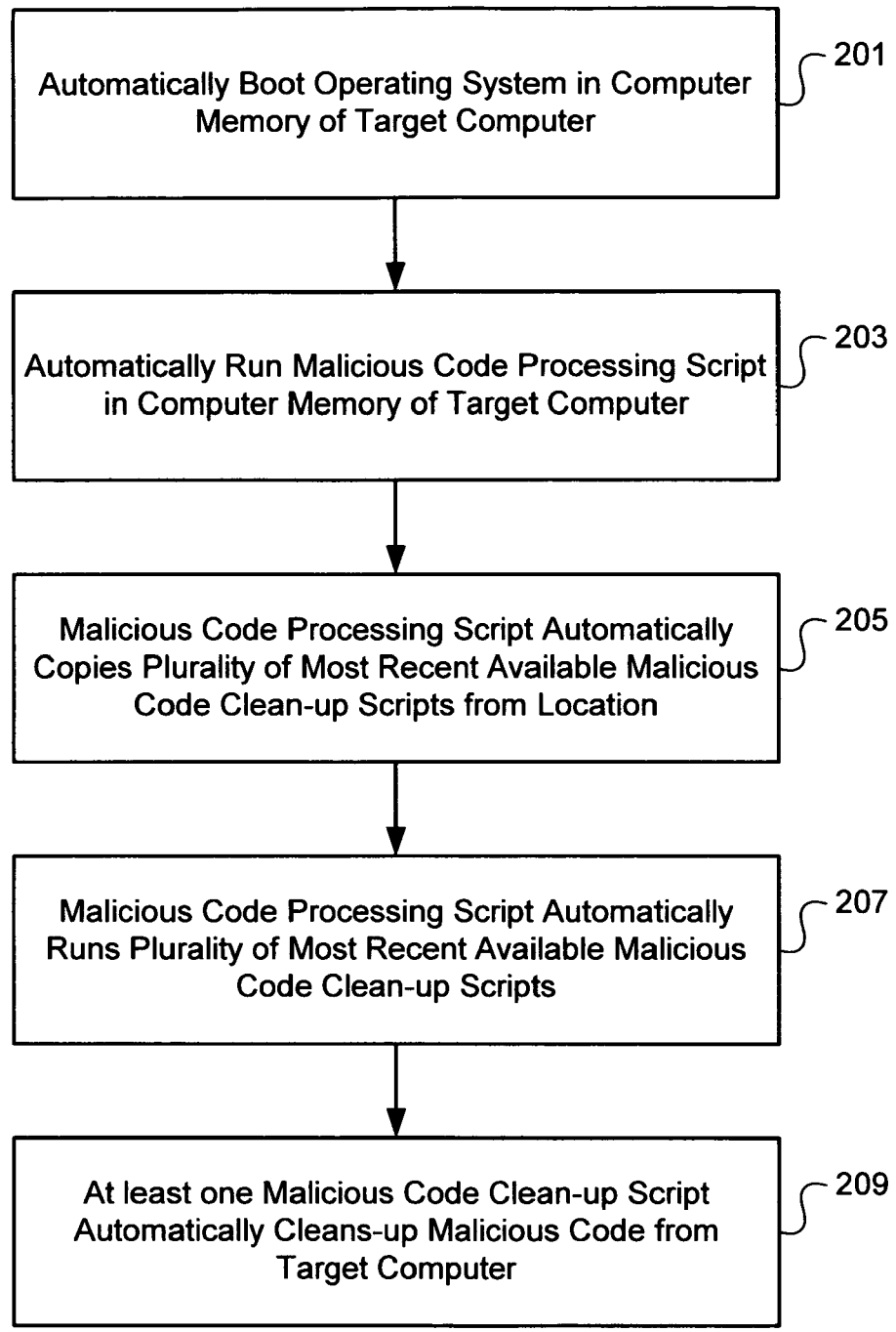
FIG. 2 is a flowchart illustrating steps for automatically copying and running a plurality of the latest malicious code clean-up scripts from a location, according to one embodiment of the present invention.

In some embodiments, the malicious code processing script 113 automatically copies and runs a plurality of the latest malicious code clean-up scripts 115 from a location, thereby automatically providing the most current available malicious code protection. FIG. 2 is a flowchart illustrating steps for performing such functionality, according to one embodiment of the present invention.

An operating system 109 automatically boots 201 in computer memory 105 of a target computer 103. The operating system 109 automatically runs 203 a malicious code processing script 113 in computer memory 105 of the target computer 103. The malicious code processing script 113 automatically copies 205 a plurality of the most recent available malicious code clean-up scripts 115 from a location, for example a server computer 117. The malicious code processing script 113 automatically runs 207 each malicious code clean-up script 115 of the plurality. At least one of the malicious code clean-up scripts 115 automatically cleans-up 209 malicious code 101 from the target computer 103.

Figure 3:
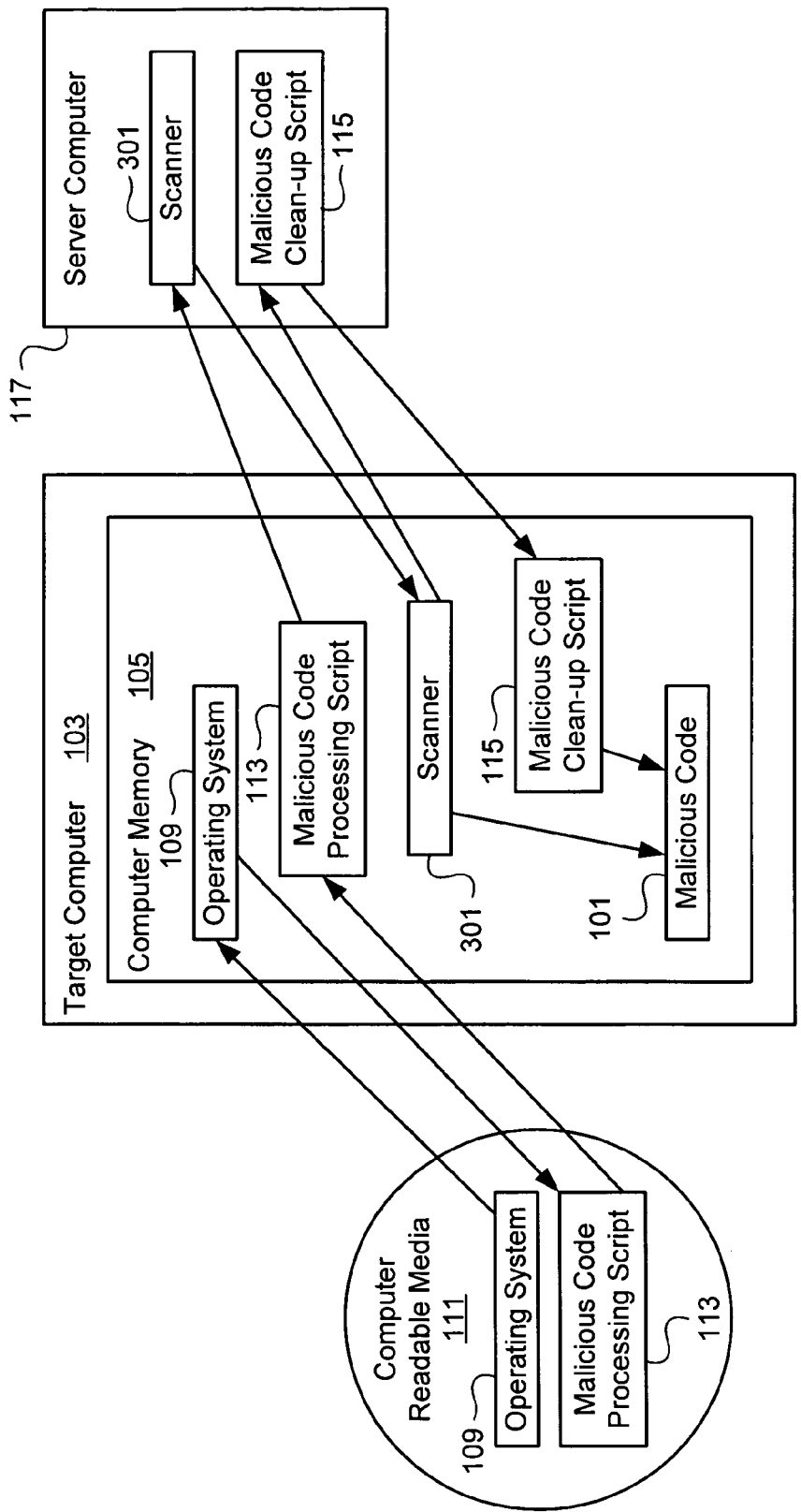
FIG. 3 is a block diagram illustrating the utilization of a scanner to determine which malicious code processing scripts to copy and run, according to one embodiment of the present invention.

FIG. 3 illustrates utilizing a scanner 301 to determine which malicious code processing scripts 115 to copy 205 and run 207 according to one embodiment of the present invention. As those ordinary skill in the relevant art are aware, scanners 301 exist which can scan files located within a computer, and identify specific known malicious code 101 that has infected that computer. For example, such scanners 301 are often components of known anti-virus software.

As illustrated in FIG. 3, the malicious code processing script 113 automatically copies a scanner software module 301 from a location, such as a server computer 117. The malicious code processing script 113 proceeds to automatically run the scanner 301 in the computer memory 105 of the target computer 103. The scanner 301 automatically identifies malicious code 101 that has infected the target computer 103. The malicious code processing script 113 then automatically copies 205 and runs 207 at least one malicious code clean-up script 115 from the location, in order to clean-up the malicious code 101 identified by the scanner 301 from the target computer 103.

Figure 4:
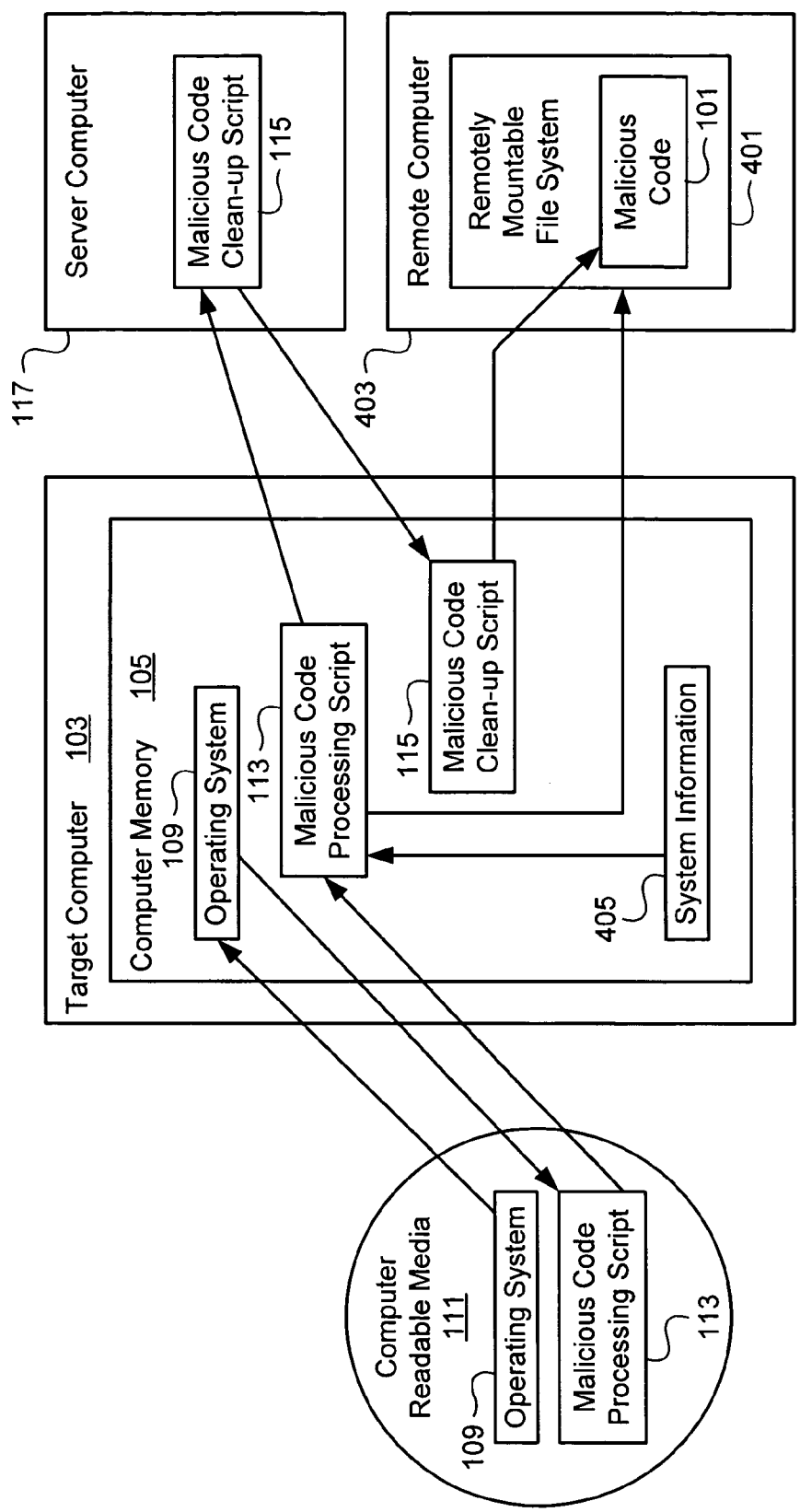
FIG. 4 is a block diagram illustrating automatic clean-up of malicious code from a remotely mountable file system, according to one embodiment of the present invention.

FIG. 4 illustrates automatically cleaning-up malicious code 101 from a remotely mounted file system 401 of a target computer 103, according to one embodiment of the present invention. As will be understood by those of ordinary skill in the relevant art, computers often have access to remotely mountable file systems 401, which physically reside on a remote computer 403, but can be configured to appear to reside on the local computer.

As illustrated in FIG. 4, the malicious code processing script 113 can read system information 405 (e.g., the Windows registry) on the target computer 103, in order to determine whether the target computer 103 has access to any remotely mountable file systems 401. The manner in which the malicious code processing script 113 reads system information 405 will be readily apparent to those of ordinary skill in the relevant art.

The malicious code processing script 113 can determine, from reading the system information 405, whether the target computer 103 has access to at least one remotely mountable file system 401. Where the target computer 103 has such access, the malicious code processing script 113 proceeds to mount the remotely mountable file system(s) 401 to which the target computer 103 has access, in a manner that will be readily apparent to those of ordinary skill in the relevant art. The malicious code processing script 113 can automatically copy 205 and run 207 malicious code clean-up script(s) 115 as described above. In this manner, if a remotely mountable file system 401 to which the target computer 103 has access is infected with malicious code 101, the malicious code 101 will be automatically cleaned-up by a malicious code clean-up script 115.

Figure 5:
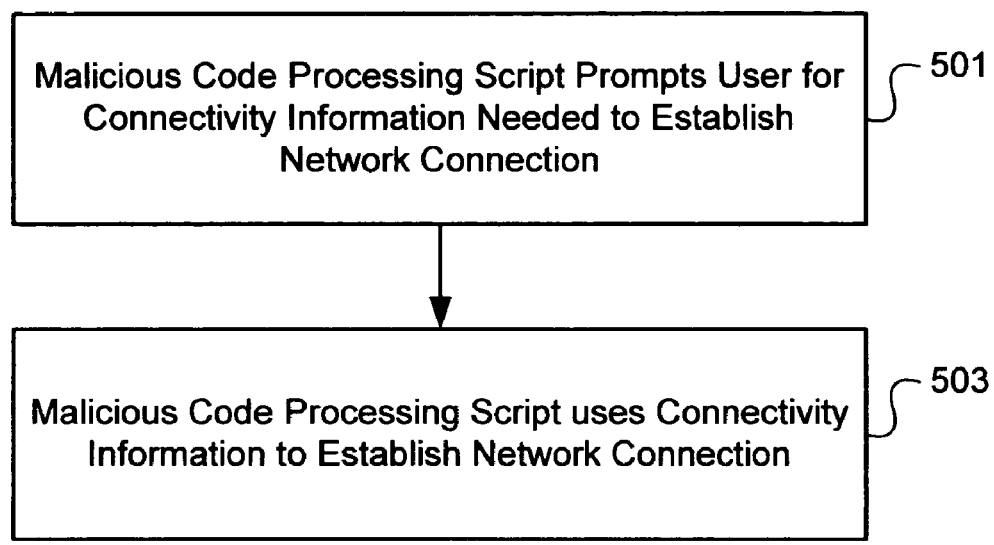
FIG. 5 is a flowchart illustrating steps for prompting a user for connectivity information, according to one embodiment of the present invention.

As explained above, in some embodiments of the present invention, the malicious code processing script 113 copies malicious code clean-up scripts 115 from a remote server computer 117. In some instances, connectivity information (for example, a user's login id and password) will be needed in order to establish the required network connection. In some embodiments, the malicious code processing script 113 prompts the user for this connectivity information, as illustrated in FIG. 5.

The malicious code processing script 113 prompts 501 the user of the target computer 103 for connectivity information needed in order to establish a network connection. The malicious code processing script 113 uses 503 the provided connectivity information to establish a network connection. The established network connection can then be used to automatically copy malicious code clean-up scripts 115 and/or a scanner 301, and/or to mount remotely mountable file systems 401, as described above.

Figure 6:
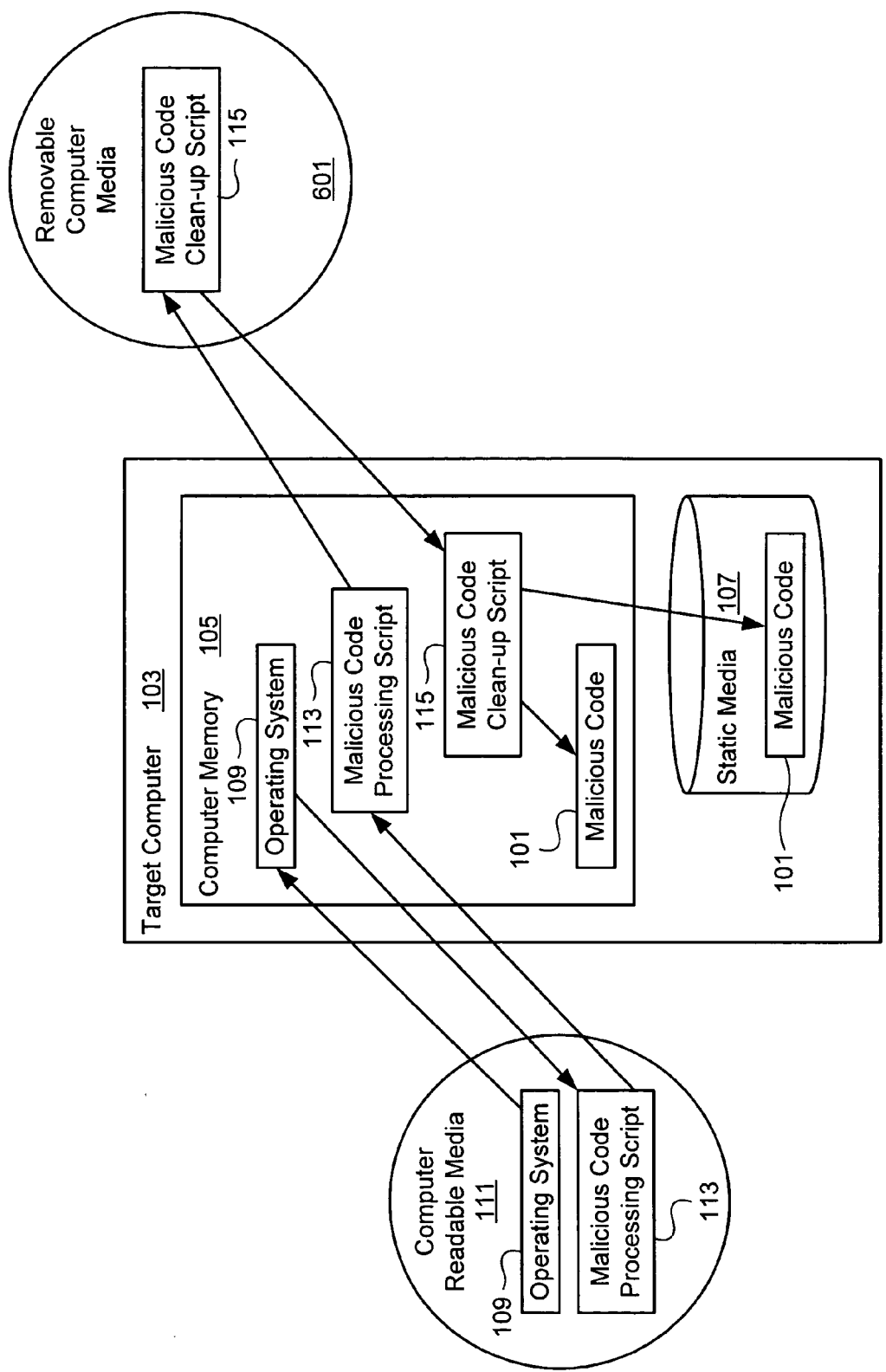
FIG. 6 is a block diagram illustrating a high level overview of another embodiment of the present invention.

It will be readily apparent to one of ordinary skill in the relevant art that in some embodiments, the malicious code processing script 113 can automatically copy 205 malicious code clean-up scripts 115 from locations other than a remote server computer 117, as desired. FIG. 6 illustrates the malicious code processing script 113 automatically copying 205 a malicious code clean-up script 115 from removable computer media 601, according to one such embodiment. Of course, a scanner 301 can also be copied from removable computer media 601.

As will be understood by those familiar with the art, the invention may be embodied in other specific forms without departing from the spirit or essential characteristics thereof. Likewise, the particular naming and division of the modules, features, attributes, scripts, methodologies and other aspects are not mandatory or significant, and the mechanisms that implement the invention or its features may have different names, divisions and/or formats. Furthermore, as will be apparent to one of ordinary skill in the relevant art, the modules, features, attributes, scripts, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for automatically cleaning-up malicious computer code from a target computer, the target computer having computer memory and an associated operating system, the method comprising the steps of:

automatically booting an operating system in the computer memory of the target computer from computer readable media, the booted operating system comprising an operating system other than the operating system associated with the target computer;

the booted operating system automatically running a malicious code processing script in the computer memory of the target computer, under control of the booted operating system;

the malicious code processing script automatically identifying a malicious code that has infected the target computer;

the malicious code processing script automatically copying at least one malicious code clean-up script for the identified malicious code from a location;

the malicious code processing script automatically running the at least one copied malicious code clean-up script in the computer memory of the target computer; and the at least one malicious code clean-up script automatically cleaning-up the identified malicious code from the target computer.

2. The method of claim 1 further comprising:

the malicious code processing script automatically determining a location where latest malicious code clean-up scripts are available;

the malicious code processing script automatically determining which of the latest malicious code clean-up scripts at the location to copy and run;

the malicious code processing script automatically copying each determined latest malicious code clean-up script from the location; and the malicious code processing script automatically running each determined latest malicious code clean-up script in the computer memory of the target computer.

3. The method of claim 1, further comprising the step of:

the malicious code processing script automatically copying a scanner from a location;

the malicious code processing script automatically running the scanner in the computer memory of the target computer to identify the malicious code that has infected the target computer.

4. The method of claim 1, further comprising the steps of:
the malicious code processing script reading system information from the target computer, in order to determine whether the target computer has access to any remotely mountable file systems;
the malicious code processing script, responsive to determining that the target computer has access to at least one remotely mountable file system, mounting at least one remotely mountable file system to which the target computer has access; and
at least one malicious code clean-up script automatically cleaning-up malicious code from at least one remotely mounted file system.

5. The method of claim 1, 2 or 3 wherein: the location comprises a remote server computer.

6. The method of claim 5 further comprising the steps of:
the malicious code processing script prompting a user for connectivity information needed in order to establish a network connection; and
the malicious code processing script using the provided connectivity information to establish a network connection.

7. The method of claim 1, 2 or 3 wherein:
the location comprises a removable computer media.

8. The method of claim 1 wherein the computer readable media from which the operating system is automatically booted comprises a computer readable media from the group of computer readable media comprising:
a removable computer readable media;
a remote computer readable media; and
a separate partition on the target computer.

9. A computer readable medium containing a computer program product for automatically cleaning-up malicious computer code from a target computer, the target computer having computer memory and an associated operating system, the computer program product comprising:
program code for enabling an operating system to automatically boot in the computer memory of the target computer, from computer readable media, the booted operating system comprising an operating system other than the operating system associated with the target computer;
program code for enabling the booted operating system to automatically run a malicious code processing script in the computer memory of the target computer, under control of the booted operating system;
program code for automatically identifying a malicious code that has infected the target computer;
program code for automatically copying at least one malicious code clean-up script for the identified malicious code from a location;
program code for automatically running the at least one copied malicious code clean-up script in the computer memory of the target computer; and
program code for automatically cleaning-up the identified malicious code from the target computer.

10. The computer program product of claim 9 further comprising:
program code for automatically determining a location where latest malicious code clean-up scripts are available;
program code for automatically determining which of the latest malicious code clean-up scripts at the location to copy and run;
program code for automatically copying each determined latest malicious code clean-up script from the location; and
program code for automatically running each determined latest malicious code clean-up script in the computer memory of the target computer.

11. The computer program product of claim 9, further comprising:
program code for automatically copying a scanner from a location;
program code for automatically running the scanner in the computer memory of the target computer to identify the malicious code that has infected the target computer.

12. The computer program product of claim 9, further comprising:
program code for reading system information from the target computer, in order to determine whether the target computer has access to any remotely mountable file systems;
program code for mounting at least one remotely mountable file system to which the target computer has access; and
program code for automatically cleaning-up malicious code from at least one remotely mounted file system.

13. The computer program product of claim 9, 10 or 11 wherein:
the location comprises a remote server computer.

14. The computer program product of claim 13 further comprising:
program code for prompting a user for connectivity information needed in order to establish a network connection; and
program code for using the provided connectivity information to establish a network connection.

15. The computer program product of claim 9, 10 or 11 wherein:
the location comprises a removable computer media.

16. A computer system for automatically cleaning-up malicious computer code from a target computer, the target computer having computer memory and an associated operating system, the computer system comprising:
an operating system booting module, for automatically booting an operating system in the computer memory of the target computer from computer readable media, the booted operating system comprising an operating system other than the operating system associated with the target computer;
a script running module, for automatically running a malicious code processing script in the computer memory of the target computer, under control of the booted operating system, and for automatically running at least one malicious code clean-up script in the computer memory of the target computer, the script running module being communicatively coupled to the operating system booting module;
a script copying module, for automatically identifying a malicious code that has infected the target computer, and for automatically copying at least one malicious code clean-up script for the identified malicious code from a location, the script copying module being communicatively coupled to the script running module; and
a malicious code clean-up module, for automatically cleaning-up the identified malicious code from the target computer, the malicious code clean-up module being communicatively coupled to the script running module.

17. The computer system of claim 16, wherein:

the script copying module is further adapted to automatically determine a location where latest malicious code clean-up scripts are available;

the script copying module is further adapted to automatically determine which of the latest malicious code clean-up scripts at the location to copy and run;

the script copying module is further adapted to automatically copy each determined latest malicious code clean-up script from the location; and the script running module is further adapted to automatically run each determined latest malicious code clean-up script in the computer memory of the target computer.

18. The computer system of claim 16, further comprising:

a scanning module communicatively coupled to the script copying module, and to the script running module; and wherein:

the script copying module is further adapted to automatically copy the scanning module from a location; and the script running module is further adapted to automatically run the scanning module in the computer memory of the target computer to identify the malicious code that has infected the target computer.

19. The computer system of claim 16, 17 or 18 wherein:
the location comprises a remote server computer.

20. The computer system of claim 16, 17 or 18 wherein:
the location comprises a removable computer media.

* * * * *